US010327165B2

(12) United States Patent
Lee et al.

(10) Patent No.: US 10,327,165 B2
(45) Date of Patent: Jun. 18, 2019

(54) METHODS AND SYSTEMS FOR MONITORING MOBILE NETWORKS

(71) Applicants: Khalifa University of Science, Technology and Research; British Telecommunications plc, London (GB); Emirates Telecommunications Corporation, Abu Dhabi (AE)

(72) Inventors: Beum Seuk Lee, London (GB); Dymitr Ruta, Abu Dhabi (AE); Kin Poon, Abu Dhabi (AE); Okung Ntofon, London (GB); Sid Shakya, London (GB); Gilbert Owusu, London (GB)

(73) Assignees: Khalifa University of Science, Technology and Research, Abu Dhabi (AE); British Telecommunications PLC, London (GB); Emirates Telecommunications Corporation, Abu Dhabi (AE)

( * ) Notice: Subject to any disclaimer, the term of this patent is extended or adjusted under 35 U.S.C. 154(b) by 10 days.

(21) Appl. No.: 15/386,243

(22) Filed: Dec. 21, 2016

(65) Prior Publication Data

US 2018/0176803 A1 Jun. 21, 2018

(51) Int. Cl.
*H04L 12/24* (2006.01)
*H04L 12/26* (2006.01)
(Continued)

(52) U.S. Cl.
CPC .......... *H04W 24/08* (2013.01); *G06F 16/904* (2019.01); *H04L 41/5022* (2013.01);
(Continued)

(58) Field of Classification Search
CPC ...... H04W 24/02; H04W 24/08; H04W 72/04
See application file for complete search history.

(56) References Cited

U.S. PATENT DOCUMENTS 7,561,876 B2 7/2009 Chiou et al.
9,503,919 B2 * 11/2016 Sofuoglu .............. H04W 24/02
(Continued)

OTHER PUBLICATIONS

Design of Reliable Communications Networks, Planning Reliable UMTS Terrestrial Access Network, Attila Szlovenscak, Istvan Godor, and Janos Harmatos, Ericsson Research, Hungary Tibor Cinkler, Budapest University of Technology and Economics, IEEE Communications Magazine, Jan. 2002.
(Continued)

*Primary Examiner* — Redentor Pasia
(74) *Attorney, Agent, or Firm* — Calfee, Halter & Griswold, LLP

(57) ABSTRACT

This invention relates to methods and systems for monitoring mobile service quality in a mobile network and also for determining parts of a mobile network which need expansion or upgrade. Embodiments of the invention monitor the market impact and/or service quality, and determine an expansion ranking. The market impact, service quality and/or expansion ranking may view the network from a plurality of perspectives, including a location perspective, an historical time perspective, a future time perspective and/or a network element type perspective. The results of the monitoring and determining can be acted on by predetermined rules and/or actions to derive a list of prioritized expansion tasks for the network.

16 Claims, 2 Drawing Sheets

(51) Int. Cl.
*H04W 24/08* (2009.01)
*G06F 16/904* (2019.01)

(52) U.S. Cl.
CPC .......... *H04L 43/08* (2013.01); *H04L 43/0876* (2013.01); *H04L 43/16* (2013.01)

(56) References Cited

U.S. PATENT DOCUMENTS

| | | | |
|---|---|---|---|
| 2007/0002759 A1* | 1/2007 | Diaz | H04L 43/0817 370/252 |
| 2010/0149984 A1 | 6/2010 | Kapoor et al. | |
| 2010/0203881 A1* | 8/2010 | del Rio Romero | H04W 24/02 455/423 |
| 2011/0092195 A1* | 4/2011 | Hussein | H04W 24/02 455/418 |
| 2012/0087269 A1* | 4/2012 | Hussein | H04W 72/04 370/252 |
| 2014/0181257 A1* | 6/2014 | Sridhar | H04W 4/029 709/219 |

OTHER PUBLICATIONS

Global Expansion Model for Mobile Networks, Marc St. Hilaire, Steven Chamberland, IEEE Communications Letters, vol. 10, No. 6, Jun. 2006.

* cited by examiner

METHODS AND SYSTEMS FOR MONITORING MOBILE NETWORKS

FIELD OF THE INVENTION

The present invention relates to methods and systems for monitoring mobile networks. It is particularly, but not exclusively concerned with methods and systems for determining parts of a mobile network which need expansion or upgrade and prioritising the order of those expansions or upgrades.

BACKGROUND OF THE INVENTION

As the demands for mobile data and its services increase dynamically and rapidly, expansions of mobile networks are unavoidable and require an intelligent planning to mechanism to optimize the utilization of expensive network resources while maximizing the revenue and meeting the expected quality of service for customers.

There are several mechanisms for expanding mobile networks in response to demand requirements and how those affect the quality of service offered by the mobile network operator ("MNO"). For example, additional micro-processors of channel elements (e.g. Code Division Multiple Access) can be deployed to cope with increasing demand for bands of frequencies. Deployed radio transmitters can be upgraded with higher power configurations to handle higher demands for power. Coding schemes that typically serve up to 15 customers per sector can accommodate more customers by increasing the number of frequency channels used. Signal coverage can also be changed by adjusting the tilting angle of an antenna. In addition, a new base station may need to be added so as to reduce the loads of neighbouring base stations, to accommodate the introduction of a new set of customers, or to deal with sudden high demands due to the occurrence of unexpected events.

When an MNO makes a decision on the need to expand a mobile network segment, it does not only consider the degradation of network service due to the overload from a high demand, but it also needs to take into consideration the importance of the network segment in terms of, for example, the overall benefit of the expansion, the number of high-paying customers (also called prestige customers) that use this network segment, and its customer churn rate.

Some of the mechanisms used for expansion (e.g. the construction of a new base station) require an extended time frame to complete the task. In such scenarios, it is possible that customers (in particular prestige customers) may decide to change service providers before the completion of the expansion due to frustration from receiving poor service quality.

As a result, prioritizing the expansion of network segments according to the Quality of Service being delivered as well as potential customer churn rate is very important. By giving higher priority to the network segments that serve significant numbers of prestige customers that are experiencing relatively poor service quality, an MNO may be able to prevent these prestige customers from churning, and in turn avoid or reduce the risk of revenue loss.

St-Hilaire, M.; Chamberland, Steven; Pierre, Samuel, "Global expansion model for mobile networks," Communications Letters, IEEE, vol. 10, no. 6, pp. 453, 455, June 2006 describes a mathematical model aimed at solving an expansion problem of Universal Mobile Telecommunications System (UMTS) networks. UMTS is a 3G mobile cellular system based on the GSM network standard. The proposed model attempts to solve the mobile access network and the core network simultaneously by minimizing the network expansion cost. The cost includes adding or removing network nodes and links subject to the number of subscribers in that area, traffic flow conversation constraints and equipment and links constraints. A set of potential sites to install different types of nodes (e.g. cell sites, Radio Network Controllers (RNCs), Mobile Switching Centers (MSCs)) is first identified. Different types of network nodes and connections have different associated costs. A Mixed Integer Linear Programming (MILP) based approach is then applied to minimize the total cost. An expansion model for 3G mobile networks is proposed with small instances as pointed out by the authors. However, during the network expansion, no consideration is made of historical data, geographical locations and high value generated customers.

Szlovencsak, A.; Godor, I.; Harmatos, J.; Cinkler, T., "Planning reliable UMTS terrestrial access networks," Communications Magazine, IEEE, vol. 40, no. 1, pp. 66, 72, January 2002 doi: 10.1109/35.978051 describes two different heuristic algorithms based on the Simulated Annealing approach to perform reliable planning for UMTS access networks. It assumes that locations of radio base stations (RBSs) and a single location of radio network controller (RNC) with the traffic demands and reliability expectations are given. The objective is to form a minimum cost tree network to connect a set of RBSs to a single RNC in order to fulfil the given topology constraints and traffic demands. In addition, reliability enhancement algorithms are introduced by inserting additional links to improve the network reliability for the single failure scenario. Thus this paper is mainly focused on the mobile access network planning with the consideration of protecting the most failure-sensitive parts of the topology.

U.S. Pat. No. 7,561,876 relates to mobile communication network planning and mobility management optimization. The system described in this patent generates results of mobility management optimization and the deployment plan which provides recommendations on how to restructure network elements to improve traffic and balance loads within a network planning area. Different algorithms such as K-L algorithm, Greedy algorithm, Genetic algorithm, and Simulated Annealing algorithm, etc. are provided to optimize the network plan. A graphical user interface (GUI) front-end is included in the planning system to allow users to analyse traffic conditions and determine an optimal plan which meets customer's requirements (e.g. reducing signalling congestion, improving inter-Base Station Controller (BSC)/Mobile Switching Center (MSC) handover failures, a higher quality of service, etc.). The inputs to the system are the network topology and the associated network statistic data which includes traffic behaviours of network elements in the mobile network. In addition, a mobility model is employed to characterize subscriber movement patterns at different times within the mobile network.

US 2010/0149984 describes a system which monitors call routing, IP traffic, statistics, signalling and CDRs (Customer Data Records). The system maintains an offline database of the network for a service provider; updating database during non-peak hours of operation and maintaining updated statistics generated by the network switches. Based on the analysis of information gathered, the system generates different scenarios to optimize the network and provide expansion plans. It is achieved by creating auto mappings and adding trunk automatically for traditional 2G switching environment. For 4G technologies or IP based network solutions, it re-routes the traffic/packets depending on the least cost routing. In addition, the system analyzes traffic, handovers, RF parameters processor load, utilization of the ports and suggest BSC/RNC/Routers re-routing of network elements for the expansion of BSS network. The system is also capable of providing a traffic model and capturing the case where a network element is added or deleted manually or automatically.

U.S. Pat. No. 8,385,900 describes a method to modify the communication parameters of a wireless fixed network to maximize the coverage. The method includes obtaining measurements of transmit power, frequency channel, modulation and coding scheme for at least two sectors of the wireless network when a signal strength indicator of one or more sectors is at or below a target value. A software program with the self-optimizing algorithm is executed to modify communication parameters such as base station transmitting power, antenna tilt angle, channel bandwidth and antenna gain. In addition, the coverage map is presented by the approximated Voronoi cells. A load balancing algorithm is then employed to move vertexes of the Voronoi diagrams to balance traffic for the congested regions. However, this patent only focuses on technical data to maximize the coverage.

An object of the present invention is to provide methods and systems for monitoring mobile networks which provide proactive monitoring and/or are predictive in nature.

A further object of the present invention is to provide network expansion systems and methods which are preferably fully automated, adaptive and require minimal or no human intervention.

SUMMARY OF THE INVENTION

An exemplary embodiment of the invention provides a computer-implemented method of monitoring the performance of a communication network having multiple network segments, the computer-implemented method including: collecting, for each network segment, data about network usage in that segment and storing said network usage data in a database; determining, for each network segment, at least one quality indicator related to the quality of service in that segment; calculating, from said network usage data and said at least one quality indicator, at least one performance metric representing the performance of the network segment; based on said at least one performance metric, determining a ranking score for each network segment; based on said ranking score, determining a priority order for the modification of the segments to improve their performance; and storing at least a subset of said priority order to a database.

A further exemplary embodiment of the invention provides a performance monitoring system for monitoring the performance of a communication network, the network having multiple network segments, the system including: a processor; and at least one database, wherein the processor is configured to: collect, for each network segment, data about network usage in that segment and store said network usage data in one of said databases; determine, for each network segment, at least one quality indicator related to the quality of service in that segment; calculate, from said network usage data and said at least one quality indicator, at least one performance metric representing the performance of the network segment; based on said at least one performance metric, determine a ranking score for each network segment; based on said ranking score, determine a priority order for the modification of the segments to improve their performance; and store at least a subset of said priority order to one of said databases.

BRIEF DESCRIPTION OF THE DRAWINGS

Embodiments of the invention will now be described by way of example with reference to the accompanying drawings in which.

DETAILED DESCRIPTION

Figure 1:
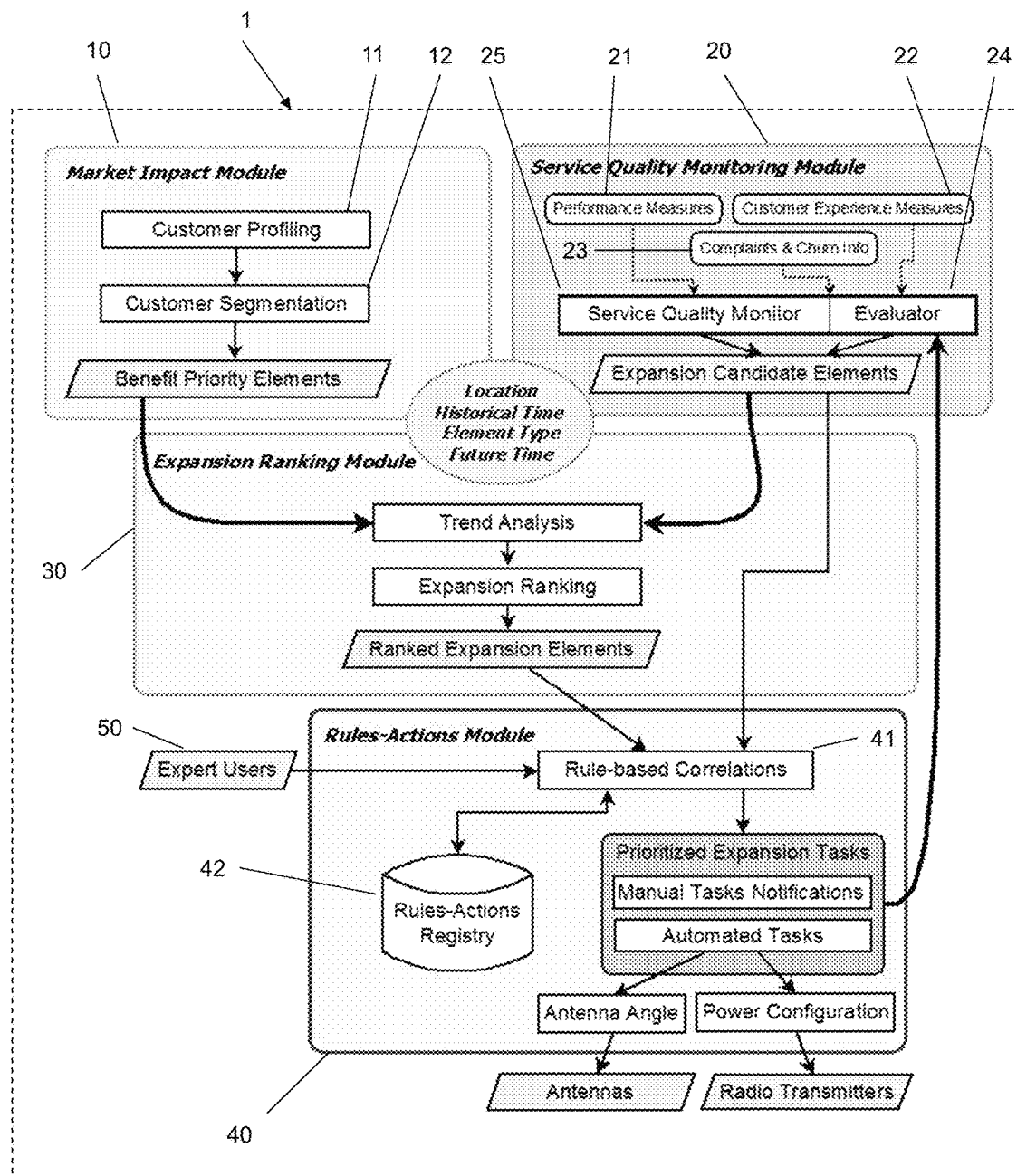
FIG. 1 shows an overview of a network expansion system according to an embodiment of the present invention.

At their broadest, aspects of the present invention provide for methods and systems for monitoring mobile networks which determine a priority order for the modification of segments within the network to improve their performance.

A first aspect of the present invention provides a computer-implemented method of monitoring the performance of a communication network having multiple network segments, the computer-implemented method including: collecting, for each network segment, data about network usage in that segment and storing said network usage data in a database; determining, for each network segment, at least one quality indicator related to the quality of service in that segment; calculating, from said network usage data and said at least one quality indicator, at least one performance metric representing the performance of the network segment; based on said at least one performance metric, determining a ranking score for each network segment; based on said ranking score, determining a priority order for the modification of the segments to improve their performance; and storing at least a subset of said priority order to a database.

The network segments may be radio network controllers (RNC), sites, sectors, and cells in the network. Typically the network segments apply to geographic regions which may or may not overlap with each other.

The computer-implemented method of the present aspect can inform network expansion by prioritizing the expansion of network segments. The method can monitor the quality of service automatically based on the time and locations of subscribers. It can also evaluate which areas suffer from high congestions or generate most revenue, or some balance between such factors and determine the priority for future network modification, upgrade or expansion.

The computer-implemented method of the present aspect can monitor the service quality of the network and its impact on customer experience and market base in order to determine where modification, upgrade or expansion may be needed. In particular embodiments, the method may prioritize the candidate segments according to the level of degradation of Quality of Service (QoS) of the services being offered (as measured through the quality indicators), and their expected impact on the penetration rates of various customer segments, in particular premium customer segments. By performing or facilitating prioritized expansion, it may ensure the delivery of high QoS to those customer segments and thereby avoid or reduce major revenue losses from services downgrades and churns within those customer segments.

The computer-implemented method of the present aspect can therefore take into consideration both quality indicators and, from the data about network usage, market impact when determining the priority for network modification, upgrade or expansion.

The computer-implemented method of this aspect may allow a mobile network operator to prevent or reduce the churn or downgrades among high-paying customers who suffer from network issues such as congestion or are affected by a prolonged expansion process.

In certain embodiments, the computer-implemented method of the present aspect can determine the network expansion priority based on the expected losses in specific customer segments' base due to degrading network performance and service quality forecasted over future time windows.

Further, the computer-implemented method of this aspect can also provide proactive monitoring of the network performance and related service quality that could inform customer satisfaction and loyalty measures and programs across different market and customer segments, which is essential in the context of the competitive market of mobile services. Unlike other approaches, the method of this aspect is predictive in nature and hence can much more accurately facilitate long-term protection and expansion of customer base generated through informed and refined prioritization of network expansion.

In certain embodiments, each segment of the network has a plurality of configurable elements and the method further includes the steps of: determining, from said at least one quality indicator related to a segment, whether any elements from amongst the configurable elements in that segment require modification or not; and based on said ranking score and the at least one performance indicator for each segment, determining a priority order for the modification of elements across the communication network.

The configurable elements may be, for example: the power of a transmitter in a segment; the angle and/or height of one or more antenna associated with a transmitter; the number of micro-processors of channel elements (e.g. Code Division Multiple Access) employed; the coding schemes and/or the number of frequency channels used. In some embodiments the configurable elements may include the number and positioning of base stations, Preferably the computer-implemented method further includes: storing, in a registry, a set of a predetermined rules, each of which sets out one or more relationships between said quality indicators and said elements, and defines a plurality of modification tasks that can be performed on said elements; and applying one or more of said rules to each determined quality indicator to determine elements which require modification and a modification task required on that element.

The stored rules allow the method to automatically determine elements which can or should be modified (including upgraded or expanded) in order to improve performance based on the types of quality issues being detected by the quality indicators. This further allows the exact modification task to be defined and therefore, if possible, carried out automatically.

The rules may include, for example, comparing a quality indicator to a minimum or maximum threshold and if the threshold is, respectively, not reached or exceeded, determining a modification task to try to ensure that the threshold is met in the future. Both minimum and maximum values may be applied to a particular quality indicator either in the same rule or in separate rules. Alternatively or additionally a quality indicator may be a binary indicator ("yes"/"no") or an indicator having a discrete number of possible values. In such cases the rules may include determining if the quality indicator has a certain value or values.

For example the method may further include the steps of: determining an impact score for each of said applied rules; comparing each impact score to a stored threshold for said rule;

and carrying out said modification task only if the impact score exceeds said threshold.

In certain embodiments the computer-implemented method further includes the steps of: carrying out a modification task determined from one of said rules; predicting the performance of the network according by predicting at least one of said quality indicators for the segment in which the modification task was carried out on the assumption that the modification task had not been carried out; and evaluating the effectiveness of the modification task by comparing said predicted quality indicator with the measured value of the same quality indicator for said segment after said modification task has been carried out.

This assessment of the effectiveness of the expansion task allows the method to be adaptive and, for example, update the rules for future modifications to take account of the observed effectiveness (or lack thereof) of previous modifications. This may include determining different modification tasks in relation to certain quality indicators when they have certain values (or meeting or exceeding certain predetermined thresholds), compared to the previously set modification tasks for that eventuality. Alternatively or additionally it may include changing the order in which modification tasks are determined for a particular eventuality.

In certain embodiments at least one of the quality indicators is a predicted performance of the network segment at a future time calculated from historical data.

In certain embodiments at least one of the quality indicators is a market impact score which is calculated based on predicted changes in the size of one or more customer segments using said network.

In certain embodiments at least one of the quality indicators is a service quality score which is calculated from at least one measure of network performance, at least one measure of customer experience and at least one measure of customer loyalty, each of which is determined from collected data.

In certain embodiments at least one of said configurable elements is a multi-channel communication radio having at least one antenna configured to wirelessly communicate with a plurality of mobile devices.

In particular, in those embodiments, the possible modification tasks may include altering the angle or height of said antenna or increasing the number of communication channels or the power of said radio and the method may further include the step of carrying out a modification task on said multi-channel communication radio which is determined to be required by the application of one or more of said rules to each determined quality indicator.

In this manner the method can automatically adjust either the height or angle of the antenna of a communication radio to improve its performance, or increase the number of channels used by said radio or its power to improve its performance.

The computer-implemented method of the present aspect may include any combination of some, all or none of the above described preferred and optional features.

Further aspects of the present invention include computer programs for running on computer systems which carry out the computer-implemented method of the above aspect, including some, all or none of the preferred and optional features of that aspect.

A second aspect of the present invention provides a performance monitoring system for monitoring the performance of a communication network, the network having multiple network segments, the system including: a processor; and at least one database, wherein the processor is configured to: collect, for each network segment, data about network usage in that segment and store said network usage data in one of said databases; determine, for each network segment, at least one quality indicator related to the quality of service in that segment; calculate, from said network usage data and said at least one quality indicator, at least one performance metric representing the performance of the network segment; based on said at least one performance metric, determine a ranking score for each network segment; based on said ranking score, determine a priority order for the modification of the segments to improve their performance; and store at least a subset of said priority order to one of said databases.

The network segments may be radio network controllers (RNC), sites, sectors, and cells in the network. Typically the network segments apply to geographic regions which may or may not overlap with each other.

The system of the present aspect can inform network expansion by prioritizing the expansion of network segments. The system can monitor the quality of service automatically based on the time and locations of subscribers. It can also evaluate which areas suffer from high congestions or generate most revenue, or some balance between such factors and determine the priority for future network modification, upgrade or expansion.

The system of the present aspect can monitor the service quality of the network and its impact on customer experience and market base in order to determine where modification, upgrade or expansion may be needed. In particular embodiments, the system may prioritize the candidate segments according to the level of degradation of Quality of Service (QoS) of the services being offered (as measured through the quality indicators), and their expected impact on the penetration rates of various customer segments, in particular premium customer segments. By performing or facilitating prioritized expansion, it may ensure the delivery of high QoS to those customer segments and thereby avoid or reduce major revenue losses from services downgrades and churns within those customer segments.

The system of the present aspect can therefore take into consideration both quality indicators and, from the data about network usage, market impact when determining the priority for network modification, upgrade or expansion.

The system of this aspect may allow a mobile network operator to prevent or reduce the churn or downgrades among high-paying customers who suffer from network issues such as congestion or are affected by a prolonged expansion process.

In certain embodiments, the system of the present aspect can determine the network expansion priority based on the expected losses in specific customer segments' base due to degrading network performance and service quality forecasted over future time windows.

Further, the system of this aspect can also provide proactive monitoring of the network performance and related service quality that could inform customer satisfaction and loyalty measures and programs across different market and customer segments, which is essential in the context of the competitive market of mobile services. Unlike other approaches, the system of this aspect is predictive in nature and hence can much more accurately facilitate long-term protection and expansion of customer base generated through informed and refined prioritization of network expansion.

In certain embodiments, each network segment has a plurality of configurable elements, wherein the processor is further configured to: determine, from said at least one quality indicator related to a segment, whether any elements from amongst the configurable elements in that segment require modification or not; and based on said ranking score and the at least one performance indicator for each segment, determine a priority order for the modification of elements across the communication network.

The configurable elements may be, for example: the power of a transmitter in a segment; the angle and/or height of one or more antenna associated with a transmitter; the number of micro-processors of channel elements (e.g. Code Division Multiple Access) employed; the coding schemes and/or the number of frequency channels used. In some embodiments the configurable elements may include the number and positioning of base stations, Preferably the processor is further configured to: store, in a registry, a set of a predetermined rules, each of which sets out one or more relationships between said quality indicators and said elements, and defines a plurality of modification tasks that can be performed on said elements; and apply one or more of said rules to each determined quality indicator to determine elements which require modification and a modification task required on that element.

The stored rules allow the processor to automatically determine elements which can or should be modified (including upgraded or expanded) in order to improve performance based on the types of quality issues being detected by the quality indicators. This further allows the exact modification task to be defined and therefore, if possible, carried out automatically.

The rules may include, for example, comparing a quality indicator to a minimum or maximum threshold and if the threshold is, respectively, not reached or exceeded, determining a modification task to try to ensure that the threshold is met in the future. Both minimum and maximum values may be applied to a particular quality indicator either in the same rule or in separate rules. Alternatively or additionally a quality indicator may be a binary indicator ("yes"/"no") or an indicator having a discrete number of possible values. In such cases the rules may include determining if the quality indicator has a certain value or values.

For example the processor may be further configured to: determine an impact score for each of said applied rules; compare each impact score to a stored threshold for said rule; and cause said modification task to be carried out only if the impact score exceeds said threshold.

In certain embodiments the processor may be further configured to: cause said modification task determined from one of said rules to be carried out; predict the performance of the network according by predicting at least one of said quality indicators for the segment in which the modification task was carried out on the assumption that the modification task had not been carried out; and evaluate the effectiveness of the modification task by comparing said predicted quality indicator with the measured value of the same quality indicator for said segment after said modification task has been carried out.

This assessment of the effectiveness of the expansion task allows the system to be adaptive and, for example, update the rules for future modifications to take account of the observed effectiveness (or lack thereof) of previous modifications. This may include determining different modification tasks in relation to certain quality indicators when they have certain values (or meeting or exceeding certain predetermined thresholds), compared to the previously set modification tasks for that eventuality. Alternatively or additionally it may include changing the order in which modification tasks are determined for a particular eventuality.

In certain embodiments at least one of the quality indicators is a predicted performance of the network segment at a future time calculated from historical data.

In certain embodiments at least one of the quality indicators is a market impact score which is calculated based on predicted changes in the size of one or more customer segments using said network.

In certain embodiments at least one of the quality indicators is a service quality score which is calculated from at least one measure of network performance, at least one measure of customer experience and at least one measure of customer loyalty, each of which is determined from collected data.

In certain embodiments the system further includes a multi-channel communication radio having at least one antenna configured to wirelessly communicate with a plurality of mobile devices being one of said configurable elements.

In particular, in those embodiments, the possible modification tasks may include altering the angle or height of said antenna or increasing the number of communication channels or the power of said radio and, when the processor determines that one of said modification tasks is required by the application of one or more of said rules to each determined quality indicator, it is configured to cause said modification task to be performed on said multi-channel communication radio.

In this manner the system can automatically adjust either the height or angle of the antenna of a communication radio to improve its performance, or increase the number of channels used by said radio or its power to improve its performance.

The system of the present aspect may include any combination of some, all or none of the above-described preferred and optional features.

FIG. 1 shows an overview of a network expansion system 1 according to an embodiment of the present invention.

The system 1 consists of four main modules: the Market Impact Module 10, the Service-Quality Monitoring Module 20, the Expansion Ranking Module 30, and the Rules-Actions Module 40. As described in more detail below, each of these modules operates across four perspectives namely location perspective L, historical time perspective H, network element type perspective E, and the future time perspective T.

Under the location perspective, each module considers the problem of network expansion based on geographical locations. For example, the Market Impact Module 10 evaluates the premium customers' penetration rates of each municipal district to find out which districts contribute more to the overall benefit of the expansion compared with other districts.

With the historical time perspective, each module considers the problem of network expansion in terms of the specific subset of time slices within the time cycle. This could correspond to specific hours of the day, days of the week, or months of the year. For instance, with the Service-Quality Monitoring Module 20, the mobile network operator (MNO) may be interested in finding out the hours of the day during which the network suffers from congestions, or in comparing the service qualities between the weekdays and weekend.

With the network element type perspective, the network expansion problem is expressed in terms of the types or the hierarchy of network elements including RNC, site, sector, and cell that are chosen for expansion. As an example, with the Expansion Ranking Module 30, the MNO may want to rank the sites according to the level of degradation of QoS for services being offered.

Finally the future time perspective determines the target time window in the future for which the expected properties including the penetration rates of premium customer segments and service quality scores will be calculated.

Market Impact Module

The Market Impact Module 10 evaluates network segments according to the time flow of the market penetration rates of key customer segments which account for the major part of the volume and volatility of the profit they generate now and in the near future. The evaluation is carried out by profiling and segmenting the customers based on their actual and forecasted profile, service usage and revenue changes.

First, each customer is profiled 11 according to the type of his/her mobile device (e.g. a smartphone, a tablet, a 2G phone, etc.), the data subscription type, the data usage volume, complaint history, the duration of the contract, the characteristics of his or her residential area, and other available information (e.g. the job type, the education level, the number of the children, or monthly salary, if available).

Segmentation 12 of customers is carried out by grouping the customers with similar profiles. Some of the example segmentations can be high-paying customers with fewer complaints, high-paying customers with many complaints, customers with low-data-consumption, customers with an increasing data consumption rate, etc. This customer segmentation information by itself is very valuable for the MNO, especially for its marketing department, to understand the distribution and the statistics among the customers. This also enables MNOs to prioritize certain customers when planning expansions. For example, a customer with a high-end smartphone, living in an affluent part of the country, paying a significant amount for a mobile package with a sizable data usage, and having placed several complaints is considered to have a higher priority to retain than a customer on a prepaid data scheme who doesn't use much data and is generally happy with the service.

The Market Impact Module 10 is a fully customizable component that monitors market penetration rates among one or multiple customer segments for each network element or hierarchy across all combinations of the operating perspectives. Its proactive representation allows the capture of the impact of the future forecasted change in the absolute or relative segment sizes that directly embody current and future revenue risk and volatility impact derived from various service and contract characteristics like typical service usage, contract/service type, remaining contract duration, customer profile data etc.

Table 1 illustrates some examples of customer profiling data and their segmentation. The numbers in the brackets correspond to the respective attribute score normalized to fit a range between 0 and 100.

TABLE 1

Customer profiling and segmentation

|  | Customer 1 | Customer 2 | Customer 3 |
|---|---|---|---|
| Data package type | Unlimited (100) | 5 GB/month (82) | Prepaid (61) |
| Data usage volume | 67 GB/month (72) | 6 GB/month (85) | 5 GB/month (98) |
| Main device brand | iPhone 5S (90) | Nokia old model (43) | Samsung Note 2 (88) |
| Residence type | Industrial area (91) | Farming area (50) | Residential area (74) |
| Duration of contract | 3 years (85) | 5 months (11) | 2 years (66) |
| Number of complaints | 5 (89) | 1 (27) | 0 (0) |
| Average score $s_i$ | 87.83 | 49.67 | 64.50 |
| Segmentation type | High-paying risky | Typical-paying safe | Mid-paying safe |

Customer segmentation into $c_i$, i=1, ..., m segments is carried out directly based on the value of the customer scores $s_i$ derived based on customer profiles, service usage, charges, and other properties as mentioned in the illustrative example in Table 1.

Given the segments the Market Impact Score M for a particular locality L within the selected time slices H, at the particular network element level E along the future time horizon T is calculated as a linear combination of the absolute or relative changes in the expected sizes of the customer segments $\Delta|_i|$. These expectations are obtained through predicting customer scores at the future time horizon T and re-segmentation, after also taking into account the natural and service imposed attrition (churn, downgrades etc.) and acquisitions. The market impact score M can be therefore formulated as:

$$M(L, H, E, T) = \sum_{i=1}^{N} \alpha_i \Delta |c_i(L, H, E, t+T)| = \sum_{i=1}^{N} \alpha_i (|c_i(L, H, E, t+T)| - |c_i(L, H, E, t)|)$$

where the parameters $\alpha_i$, i=1 ... N are the coefficients of the contribution weights of different customer segment size changes towards the overall predicted market impact score M. As an example for the 3-tier customer segments of low, medium and high paying customers at site $L_1$ the market impact score over the specific network element $E_1$ during peak-time hours of $H_{peak}$ along the future time horizon T=1 year would be calculated as:

$$M(L_1, H_{peak}, E_1, t+T_{year}) = \alpha_{low} \Delta |c_{low}(L_1, H_{peak}, E_1, t+T_{year})| +$$
$$\alpha_{medium} \Delta |c_{medium}(L_1, H_{peak}, E_1, t+T_{year})| +$$
$$\alpha_{high} \Delta |c_{high}(L_1, H_{peak}, E_1, t+T_{year})|$$

Future estimates $s_i(t+T)$ of each customer segment score are calculated either by extrapolating the linear trend of the score over the past period H, or by applying more complex predictions including seasonal analysis (e.g. ARIMA) and non-linear regression as a function of customer profile and service usage data.

For the comparison of the market impact scores at different network hierarchy level, all component segment scores and their changes can be normalized with respect to the total number of customers in each segments and thereby achieve sensitivity to the relative changes (%) of market segment sizes.

Finally, given the segment score predictions and resulting changes in different market segments sizes, the parameters $\alpha_i$, i=1 ... N are typically chosen by market expert to address the specific needs of score metric. For example a provider may focus only on premium segment of customers in which case $\alpha_{high}=1$ while other weights would be set to 0.

Service-Quality Monitoring Module

The Service-Quality Monitoring Module 20 monitors a series of the measures related to the quality of service. These measures are broadly classified into network performance measures 21 and customer experience measures 22. Some examples of network performance measures are payload, throughput, power usage in percentage, and code usage in percentage. Examples of customer experience indicators are data traffic related measures that are perceived by customers such as buffering rate, webpage loading time, package loss rate, etc.

These service quality measures are also monitored across location, historical time, network element type and future time perspectives. For example, this monitoring model may detect unusually high throughputs repeatedly around midnight at a particular site in a certain geographical area. In another case, a rapidly increasing trend change of payload may be detected at an RNC in town centres during weekends. This module 20 also monitors the trend change 23 in the volume of customer complaints and the number of churning customers. The ratio between the number of churns and the number of complaints indicates the intolerance of the customers towards the delivery of poor service quality by the MNO.

All these measures are chosen and designed to measure the network performance and customer service quality, preferably as comprehensively as possible. They can thereby express the network's ability to attract and retain customer populations at different segments and drive the profit from the services delivered to them in line with their current trends extrapolated linearly over a future time horizon T.

A service quality score is defined as a linear function of all these network performance and customer service indicators that measure the difference between the total benefit estimate from Market Impact Module 10 and the actual benefit attained over the same set of customers. Note that due to the churn and network congestions the value of service quality score is likely to be positive, i.e. the later observed revenue turns out to be smaller than predicted.

Large positive service scores indicate that a significant amount of profit is expected to be lost due to service issues. These are most likely to be caused by network congestion and hence would be listed with a high priority. Conversely, a small positive or even a negative value of the service quality score means that there are neither immediate issues nor network-borne threats which are likely to limit the expansion of benefit streams in line with their expected trajectories.

As with the market impact score, the service quality score Q is calculated for a preset location L, historical time slices H, network element E and stretches its impact over the same future time horizon T. Three groups of service and network quality variables contribute to the service quality score: network performance measures, customer experience measures and customer loyalty measures. A brief non-exhaustive list of the typical variables which could fall within each family is listed below:

Network performance measures: payload, throughput, power, code, spare capacity, etc.

Customer experience measures: dropped calls rate, buffering frequency, faults rate, slow connection incidences, package corruptions, etc.

Customer loyalty measures: complaints, enquiries, churn, service downgrade rates, etc.

Similar to the market impact score, the service quality score is computed as a linear combination of the variable families: network performance, customer experience and loyalty at the particular time t:

$$Q(L,H,E,t) = \beta_1 q_{performance}(L,H,E,t) + \beta_2 q_{experience}(L,H,E,t) + \beta_3 q_{loyalty}(L,H,E,t)$$

The component service variables and their corresponding parameters $\beta_i$ can be expanded to the individual feeding variables or kept in the compactly grouped representation like in the equation above, in which case they themselves represent the group weights of the linear combinations over original service variables $v_i$ as shown in the example of the performance group of original variables:

$$\beta_1 q_{performance}(L,H,E,t) = \beta_1 \Sigma_{i=1}^n b_i v_i(L,H,E,t)$$

It is then assumed that the changes in quality of service cause changes in market penetration i.e. the changes in customer segment sizes as defined by the market impact metric M described above.

$$M(L,H,E,t) = f_{linear}(\Delta Q(L,H,E,t+T)) = a\Delta Q(L,H,E,t+T) + b$$

The linear parameter a can be incorporated into the quality of service variable coefficients $\beta_i$ and they can be computed by regression over historically observed mappings between the changes in the quality of service metrics and the corresponding changes in the customer segment sizes.

Note that this interpretation of the service quality score is straightforward as it directly explains the correlation with the market impact. It effectively expresses how many customers in each customer segment might be lost or gained as a result of the changes in the service quality that will develop between now: i.e. at time t and the time t+T with and without an expansion intervention. In the context of the network expansion, when presented with the choice of possible extension at different hierarchy levels, market impact metric helps to prioritize the order of jobs according to defined criteria, for example such that the loss of premium segment customers is kept minimized. It may also help to simulate what the effect of individual proactive network extensions might be on the projected customer number changes in each segments at the particular locality.

There is a sub-module within the Service Quality Monitoring Module 20 called the Evaluator 24. The Evaluator 24 compares the measures of the mobile network performance, the customer experiences, and the customer loyalty for the preset future time period T before and after the implementation of the tasks selected for the expansion of the mobile network, and provides the evaluation of the expansion tasks to Service Quality Monitor 25.

Service Quality Monitor 25 evaluates the effectiveness of the expansion task by measuring the difference between Q values before and after expansion. It then updates the relevant lookup tables available for given perspective settings of location L, historical time slices H, network element E, and future time horizon T. This checking is particularly important as it ensures that next time when the expansions is considered, the predicted service quality Q values are corrected by the stored information to increase the effectiveness of the real network expansion task. For instance, the changes of the antenna angles may not significantly improve the data signal coverage, and through the evidenced experience, the Evaluator could improve future expansions by recommending alternative angles for antenna adjustments.

Expansion Ranking Module

The Expansion Ranking Module 30 combines the evaluation scores from the Market Impact Module 10 and the Service-Quality Monitoring Module 20 to rank candidate network elements for expansion and to prioritize network expansion tasks. The system considers not only the current estimates of various scores but also their future trajectories and trend changes based on the historical data to predict the demand, customer reactions, and the expected service quality in the near future. The outcome of this module's analysis is a list of ranked network elements (and/or hierarchy levels) and the required tasks for their expansions. For example, this module could suggest that an expansion of a radio transmitter of a base station at the west part of a city needs to be achieved promptly due to the increasing number of high-paying customers who are suffering from the data coverage issue which is being caused by high power demand during weekends. In addition, the trend data from the historical data shows that the problem is not intermittent but it will only get worse.

The expansion ranking score X is calculated as a direct linear combination of the forward looking market impact score M and service quality Q:

$$X(L,H,E,T) = \gamma_M M(L,H,E,T) + \gamma_Q Q(L,H,E,T)$$

In a default embodiment the parameters $\gamma_R$ and $\gamma_Q$ are simply equal to $\gamma_M=1$, and $\gamma_Q=0$, in line with an intuitive logic to set the top priorities for the highest expected losses in premium customer base incurred by degrading network performance and service quality that can be saved through network expansion. In fact market impact score M is derived from service quality Q.

Nevertheless, some network providers may have more specific requirements that shift the priority more towards network quality or customer experience among specific customer segments, in the specific network and service circumstances, in which case alternative balances between market impact and service quality can be provided.

The parameters $\gamma$ might also be optimized with multiple linear regressions using historical expansion data or additional evidence that would inform retrospectively which priority order would be optimal.

Four perspectives (historical time, future time, location, and network element type) add detailed localization of the proposed expansion along with the three dimensions optimized for the forward-looking time horizon T.

For example, according to the Market Impact Module 10, it may be determined that most of the high-paying customers are located at areas L1, L2, and L3 using network sites E1, E2, and E3 mostly at times H1, H2, H3; and according to the Service Quality Monitoring Module 20, the areas L1, L2, L4, and L5 using network sites E1, E3, and E4 at times H2, and H4 already suffer from low QoS and are on the trajectory to dramatically deteriorate within the next T=1 year.

Based on this information, the Expansion Ranking Module 30 identifies the right combinations of the times, the locations, and network elements and ranks them accordingly. In addition, the Expansion Ranking Module 30 also provides the detailed issues that have caused the low QoS such as power outage, throughput overload, delayed buffering at the customer ends, etc. at certain times, at distinct locations, and with specific network element types.

In some cases the expansion task may require the changes in more than one network element or segment. For example, as a result of the network expansion analysis, a new site needs to be added to cope with a rapidly increasing demand at a certain area of the town center. This expansion also requires the changes in the configurations of the surrounding sites such as changes to the antenna angles which can be executed manually or automatically depending on the availability of automated systems for the network antenna adjustment. The detail for the action point is the exact antenna angles for the optimal signal coverage with the expansion.

In another case, the recommended detail for the task is the exact number of new sites necessary to cope with a high demand. Another example of a recommendation can be the optimal locations of new base stations given the existing data coverage and the expected demand distribution. The mapping of service quality issues to corresponding tasks is defined in the Rules-Actions Module 40 which is described below.

The Expansion Ranking Module 30 may determine the priority and ranking of the possible expansions by assigning each possibility an Expansion Ranking Score (ERS). This is a normalised score (e.g. 0-100) which signifies the seriousness of the issues which will be addressed by change or expansion of a particular network element.

Rules-Actions Module

The service quality issues and ranked expansion elements which have been identified by the Expansion Ranking Module 30 are forwarded to the Rules-Actions Module 40. This module facilitates the actions that need to be carried out by the MNO to reduce the churn of unsatisfied customers and also maximize the benefit of the expansion. It allows expert users 50 (mainly network planners and engineers) working with MNOs to define rules with the actions required to prevent or recover from poor service quality.

These rule-based correlations 41 are defined in a natural-language-like syntax and map network service quality issues with corresponding actions. These correlations can also provide the link between the Expansion Ranking Score (ERS) and the details of the expansion actions to be executed. Example rules are shown below:

```
If expansion is regarding power outage
    then task is power increase or adjust antenna angle.
If expansion is regarding throughput overload at site level
    then task is add site and ( tilt down antennas of neighbouring sites
    or adjust antenna angles of neighbouring sites ).
....
If task is tilting down antenna and ERS > 45
    then angle = ERS − 45.
If task is add base station
    then required site number = ERS/10.
If task is power increase
    then {
        if current radio transmitter is old model
            then task is replace transmitter
        otherwise
            task is upgrade transmitter}.
....
```

The construction of the rules allows domain experts to fine-tune the coefficients and parameters in the conditional statements, and the consequence statements according to the specific requirements and business goals of the MNO. In addition, experts are able to define the prioritization of rules for the scenarios where multiple actions can be executed to overcome poor service quality issues.

The Rules-Actions Module 40 has a Registry 42 which provides non-volatile storage for all rule-based correlations defined by expert users. The stored information includes an Impact Score for each rule; this is a measure of how effective a rule was when it was applied to overcome poor service quality. The Registry 42 provides a means for all the parameters and coefficients in the three main modules to be learnt and improved through the Evaluator 24 (in the Service Quality Monitoring Module 20). Improvements can be achieved by utilizing an optimization algorithm over the historical data of network expansion traces.

The Rules-Action Module 40 generally operates in an automatic mode.

In the automatic mode, the Rules-Action Module 40 resolves actions to be executed without human intervention. This is achieved using the entries which are available in the Registry 42 for the specific service quality issue and the ranked expansion elements identified by the Expansion Ranking Module 30. For the Rules-Actions Module 40 to operate in this mode, expert users 50 will have defined rule-based correlations 41 in advance. While operating in the automatic mode, the Rules-Action Module 40 will only require human intervention if one of the following two scenarios occurs: (a) the Registry 42 does not have any relevant entries for the identified service quality issues, or (b) the expert users 50 define a threshold for acceptable Impact Scores and the entries in the Registry have less than acceptable values.

Figure 2:
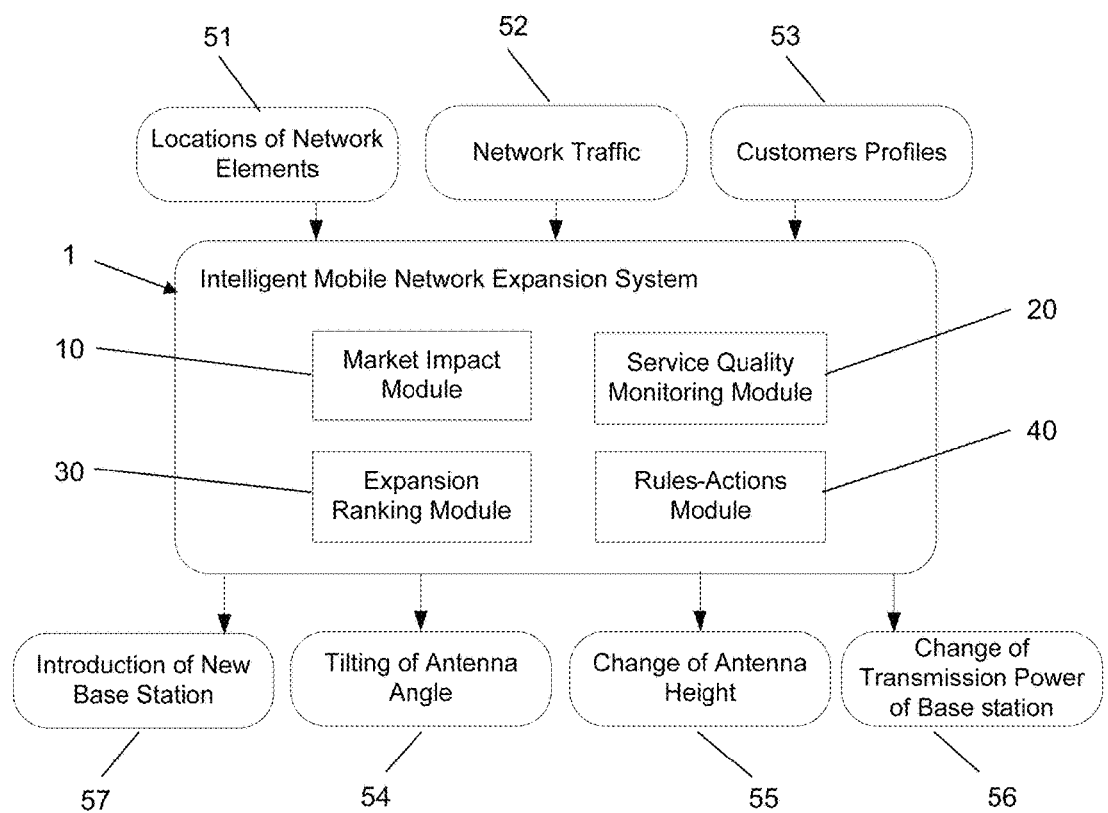
FIG. 2 shows the workflow in a network expansion system according to an embodiment of the present invention.

As shown in FIG. 2, in one embodiment of the invention an automatic decision system is provided which takes as inputs data on the locations of network elements 51, data on network traffic 52 and information on customers' profiles 53. This data is processed by the network expansion system 1 (which may be as shown in FIG. 1) which generates a list of ranked tasks or actions, which might include, as illustrated in FIG. 2, adjustment of the angle of an antenna 54, changing the height of an antenna 55 or changing the power of a base station 56. It may also be appropriate for the network expansion system to provide, as part of its output, notifications or instructions to human users for tasks which cannot be performed automatically, such as when a new base station needs to be introduced 57. Such instructions or notifications may include further information determined by the network expansion system 1, such as the number and the locations of sites for new base stations.

In another embodiment of the present invention, following the resolution of actions to be executed by the Rules-Actions Module 40, real-time automated expansion tasks are executed. These may include the physical tilting of antenna angles or adjustment of power configurations via signals over in-band or out-of-band control signalling. By automatically tilting down an antenna angle to a specific degree using a remote control mechanism, the coverage can be enhanced and the interference reduced. Tilting the antenna angle or changing the antenna height, the coverage area of the service can be either reduced or expanded for load balancing which can affect the bit rate and total cell throughput for not only the target cells but also their neighbours.

The systems and methods of the above embodiments may be implemented in a computer system (in particular in computer hardware or in computer software) in addition to the structural components and user interactions described.

The term "computer system" includes the hardware, software and data storage devices for embodying a system or carrying out a method according to the above described embodiments. For example, a computer system may comprise a central processing unit (CPU), input means, output means and data storage. Preferably the computer system has a monitor to provide a visual output display. The data storage may comprise RAM, disk drives or other computer readable media. The computer system may include a plurality of computing devices connected by a network and able to communicate with each other over that network.

The methods of the above embodiments may be provided as computer programs or as computer program products or computer readable media carrying a computer program which is arranged, when run on a computer, to perform the method(s) described above.

The term "computer readable media" includes, without limitation, any non-transitory medium or media which can be read and accessed directly by a computer or computer system. The media can include, but are not limited to, magnetic storage media such as floppy discs, hard disc storage media and magnetic tape; optical storage media such as optical discs or CD-ROMs; electrical storage media such as memory, including RAM, ROM and flash memory; and hybrids and combinations of the above such as magnetic/optical storage media.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

In particular, although the methods of the above embodiments have been described as being implemented on the systems of the embodiments described, the methods and systems of the present invention need not be implemented in conjunction with each other, but can be implemented on alternative systems or using alternative methods respectively.

REFERENCES

St-Hilaire, M.; Chamberland, Steven; Pierre, Samuel, "Global expansion model for mobile networks," Communications Letters, IEEE, vol. 10, no. 6, pp. 453, 455, June 2006

Szlovencsak, A.; Godor, I.; Harmatos, J.; Cinkler, T., "Planning reliable UMTS terrestrial access networks," Communications Magazine, IEEE, vol. 40, no. 1, pp. 66, 72, January 2002 doi: 10.1109/35.978051

U.S. Pat. No. 7,561,876

US Patent application 2010/0149984

U.S. Pat. No. 8,385,900

All references referred to above are hereby incorporated by reference.

The invention claimed is:

1. A computer-implemented method of monitoring improving the performance of a communication network having multiple network segments, the computer-implemented method including:
    collecting, for each network segment, data about network usage in that segment and storing said network usage data in a database;
    determining, for each network segment, a plurality of quality indicators related to the quality of service in that segment, wherein:
        at least one of the quality indicators is a market impact score which is calculated based on predicted changes in the size of one or more customer segments using said network; and
        at least one of the quality indicators is a service quality score which is calculated from at least one measure of network performance, at least one measure of customer experience and at least one measure of customer loyalty, each of which is determined from collected data,
    calculating, from said network usage data and said plurality of quality indicators, at least one performance metric representing the performance of the network segment;
    based on said at least one performance metric, determining a ranking score for each network segment;
    based on said ranking score, determining a priority order for the modification of the segments to improve their performance; and
    based on said priority order, performing an improvement to said communication network selected from the group of improvements consisting of adjusting an angle of an antenna of a transmitter of the communication network, adjusting a height of said antenna, increasing a number of communication channels of said transmitter, increasing a power of said transmitter, replacing said transmitter, upgrading said transmitter, and adding a base station to said communication network.

2. The computer-implemented method according to claim 1, wherein the step of determining a priority order comprises,
    based on said ranking score and at least one performance indicator for each segment, determining said priority order for the modification of elements across the communication network.

3. The computer-implemented method according to claim 1, further including:
    storing, in a registry, a set of a predetermined rules, each of which sets out one or more relationships between said quality indicators and group of improvements; and
    applying one or more of said rules to each determined quality indicator to determine which element of said group of improvements requires modification.

4. The computer-implemented method according to claim 3, further including:
    predicting the performance of the network according by predicting at least one of said quality indicators for the segment in which the improvement was performed on the assumption that the improvement had not been performed; and evaluating the effectiveness of the improvement by comparing said predicted quality indicator with the measured value of the same quality indicator for said segment after said improvement has been performed.

5. The computer-implemented method according to claim 4, further including the steps of:

determining an impact score for each of said applied rules;

comparing each impact score to a stored threshold for said rule; and performing said improvement only if the impact score exceeds said threshold.

6. The computer-implemented method according to claim 1, wherein at least one of the quality indicators is a predicted performance of the network segment at a future time calculated from historical data.

7. The computer-implemented method according to claim 3, wherein the transmitter is a multi-channel communication radio configured to wirelessly communicate with a plurality of mobile devices.

8. The computer-implemented method according to claim 7 wherein said step of performing an improvement to said communication network comprises performing an improvement selected from the group consisting of altering the angle or height of said antenna or increasing the number of communication channels or the power of said radio.

9. A performance improving system for improving the performance of a communication network, the network having multiple network segments, the system including:

a processor; and at least one database, wherein the processor is configured to:

collect, for each network segment, data about network usage in that segment and store said network usage data in one of said databases;

determine, for each network segment, a plurality of quality indicators related to the quality of service in that segment, wherein:

at least one of the quality indicators is a market impact score which is calculated based on predicted changes in the size of one or more customer segments using said network; and at least one of the quality indicators is a service quality score which is calculated from at least one measure of network performance, at least one measure of customer experience and at least one measure of customer loyalty, each of which is determined from collected data;

calculate, from said network usage data and said plurality of quality indicators, at least one performance metric representing the performance of the network segment;

based on said at least one performance metric, determine a ranking score for each network segment;

based on said ranking score, determine a priority order for the modification of the segments to improve their performance; and based on said priority order, performing an improvement to said communication network selected from the group of improvements consisting of adjusting an angle of an antenna of a transmitter of the communication network, adjusting a height of said antenna, increasing a number of communication channels of said transmitter, increasing a power of said transmitter, replacing said transmitter, upgrading said transmitter, or adding a base station to said communication network.

10. The system according to claim 9, wherein determining a priority order comprises, based on said ranking score and at least one performance indicator for each segment, determining said priority order for the modification of elements across the communication network.

11. The system according to claim 10, wherein the processor is further configured to store, in a registry, a set of a predetermined rules, each of which sets out one or more relationships between said quality indicators and said and group of improvements;

apply one or more of said rules to each determined quality indicator to determine which element of said group of improvements requires modification.

12. The system according to claim 11, wherein the processor is further configured to:

predict the performance of the network according by predicting at least one of said quality indicators for the segment in which the improvement was performed on the assumption that the improvement had not been performed; and evaluate the effectiveness of the improvement by comparing said predicted quality indicator with the measured value of the same quality indicator for said segment after said improvement has been performed.

13. The system according to claim 12, wherein the processor is further configured to:

determine an impact score for each of said applied rules;

compare each impact score to a stored threshold for said rule; and cause said improvement to be performed only if the impact score exceeds said threshold.

14. The system according to claim 9, wherein at least one of the quality indicators is a predicted performance of the network segment at a future time calculated from historical data.

15. The system according to claim 11, wherein the transmitter is a multi-channel communication radio configured to wirelessly communicate with a plurality of mobile devices.

16. The system according to claim 15 wherein said performing an improvement to said communication network comprises performing an improvement selected from the group consisting of altering the angle or height of said antenna or increasing the number of communication channels or the power of said radio.

* * * * *